(12) United States Patent
Foelster et al.

(10) Patent No.: US 6,184,272 B1
(45) Date of Patent: *Feb. 6, 2001

(54) FIBER-REINFORCED MOLDED PLASTIC PART AND PROCESS FOR ITS MANUFACTURE

(75) Inventors: Thomas Foelster, Grafenau; Ralph Greiner, Leonberg; Dirk Schaefer, Ulm, all of (DE)

(73) Assignee: DiamlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/022,446

(22) Filed: Feb. 12, 1998

(30) Foreign Application Priority Data

Feb. 12, 1997 (DE) .............................. 197 05 280

(51) Int. Cl.⁷ ................................. C08L 3/02; C08L 1/02
(52) U.S. Cl. ................................ 524/47; 523/128; 524/9; 524/13; 524/14; 536/32; 536/43; 536/45; 106/162.51; 106/162.7; 106/162.8; 106/162.81; 106/162.9
(58) Field of Search ....................... 523/128; 524/9, 524/13, 14, 15, 16, 47; 106/162.51, 162.7, 162.8, 162.81, 162.9; 536/32, 43, 45

(56) References Cited

U.S. PATENT DOCUMENTS

| | | | |
|---|---|---|---|
| 3,607,799 | * 9/1971 | Barbehenn et al. | 527/312 |
| 4,058,442 | * 11/1977 | Lee, Jr. et al. | 522/33 |
| 5,191,734 | 3/1993 | Weber et al. | 47/9 |
| 5,238,969 | * 8/1993 | Guarneri et al. | 524/785 |
| 5,269,991 | * 12/1993 | Gueret | 264/73 |
| 5,352,709 | * 10/1994 | Tarrant et al. | 524/9 |
| 5,436,930 | * 7/1995 | Maine et al. | 524/14 |
| 5,464,878 | * 11/1995 | Nemphos et al. | 524/601 |
| 5,596,031 | * 1/1997 | Lock | 524/35 |
| 5,660,900 | * 8/1997 | Andersen et al. | 524/442 |
| 5,663,216 | * 9/1997 | Tomka | 524/13 |
| 5,672,639 | * 9/1997 | Corvasce et al. | 524/52 |
| 5,719,203 | * 2/1998 | Thobor | 524/9 |

FOREIGN PATENT DOCUMENTS

| | | |
|---|---|---|
| 0 551 125 A1 | 7/1993 | (EP) . |
| 320524 | 12/1993 | (JP) . |
| 345836 | 12/1993 | (JP) . |
| 311243 | 11/1996 | (JP) . |
| 263700 | 10/1997 | (JP) . |
| WO 95/04106 | 2/1995 | (WO) . |

OTHER PUBLICATIONS

Special Edition of Automobiltechnische Zeitung (ATZ), Jul./Aug. 1996, p. 74–77.

\* cited by examiner

*Primary Examiner*—Peter A. Szekely
(74) *Attorney, Agent, or Firm*—Evenson, McKeown, Edwards & Lenahan, P.L.L.C.

(57) ABSTRACT

A fiber-reinforced molded plastic part, a process for its manufacture and a use. The fiber-reinforced molded plastic part consists of a plastic matrix with natural fibers particularly arranged in a uniformly distributed manner in the plastic matrix. The plastic matrix has at least two mutually mixed polymers, of which one is a biopolymer and the other is a polymer which is at least largely resistant to biological stress.

11 Claims, 2 Drawing Sheets

FIBER-REINFORCED MOLDED PLASTIC PART AND PROCESS FOR ITS MANUFACTURE

BACKGROUND AND SUMMARY OF THE INVENTION

This application claims the priority of German Patent Document 197 05 5280.0.

The invention relates to a fiber-reinforced molded plastic part as well as to a process for its manufacture, both being known from the article on which this application is based and which has the title "Materials in Automobile Construction", published in the German Special Edition of Automobiletechnische Zeitunq (ATZ), July/August 1996, Page 74–77.

From the article, a fiber-reinforced molded plastic part is known which is formed of a plastic matrix and of natural fibers which are embedded in the plastic matrix. In order to ensure a good disposal of the molded plastic parts, the plastic matrix consists of so-called biopolymers which are natural organic macromolecules and are obtained from reproducible raw materials, such as sugar beets, potatoes, corn, cellulose or used paper. Natural fibers are those fibers which are obtained from nature as reproducible raw materials. Molded plastic parts of this type of construction, when being disposed of, are biologically degradable without any reservations because all their organic constituents will decay, and in the decaying cycle, will be converted into water, $CO_2$, humus and biomass. Bacteria and fungi will grow in the decay. $CO_2$ formed during the decaying process is neutral, in the ecological balance, because it had previously been taken from the atmosphere for producing the raw materials.

However, when these molded parts are used, they are susceptible to biological stress which is why they are not completely suitable for use as high-quality and durable molded parts. Normally, these molded plastic parts are especially protected for use as durable high-quality molded parts. These are particularly useful in the automobile industry. This takes place by applying a protective coating, such as lacquers, or such polymers are selected as biopolymers, which have a slow decay process. But, a coating which protects from biological stress has substances which cause ecological concern; during disposal, the slow decaying process requires a lot of time and disposal space or a high-expenditure comporting facility.

It is an object of the invention to further develop a molded plastic part such that, while it can be disposed of in a simple manner and without ecological reservations, it can also be used as a durable high-quality molded plastic part. Furthermore, it is an object to develop a process by which such molded plastic parts can be manufactured.

With respect to the molded plastic part on which this invention is based, this object is achieved by a fiber-reinforced molded plastic part, the part having at least 80% raw materials by weight, the part comprising a plastic matrix having natural fibers, the plastic matrix comprising at least one biopolymer and at least one polymer, the at least one polymer being largely resistant to biological stress. A process is also provided. By using biopolymers which are, for the most part, enclosed by polymers which are largely resistant to biological stress, components manufactured from such materials have a good stability. Furthermore, after their useful life, they can either be recycled with respect to their material, for example, by a new thermoplastic processing, optionally separated according to the biopolymer and the resistant polymer, or can be jointly subjected to a $CO_2$-neutral degrading process.

Other objects, advantages and novel features of the present invention will become apparent from the following detailed description of the invention when considered in conjunction with the accompanying drawings.

DETAILED DESCRIPTION OF THE DRAWINGS

Figure 1:
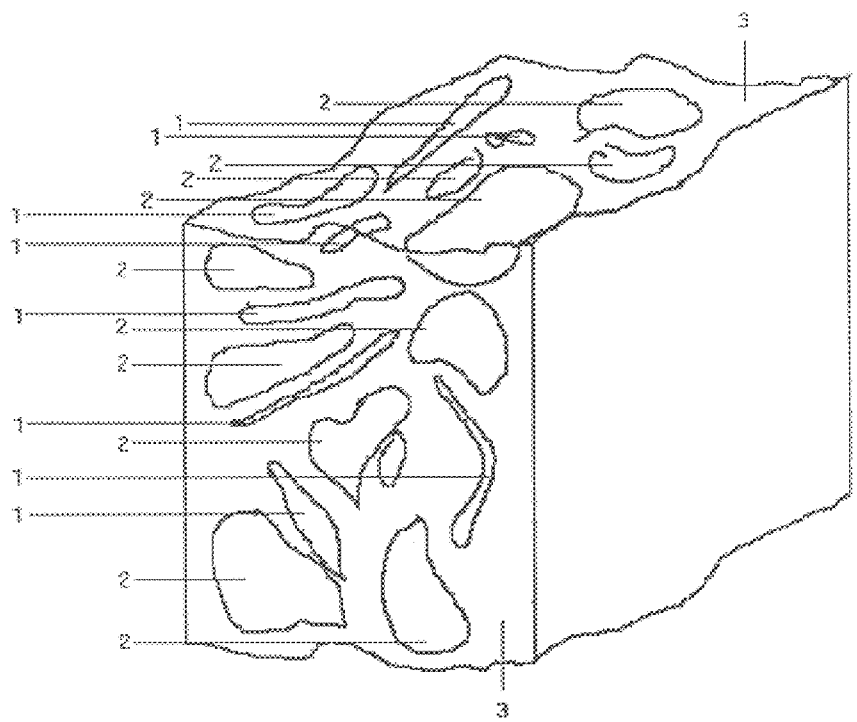
FIG. 1 is a sectional view of a plate-type molded plastic part.

FIG. 1 illustrate s the basic interior construction of a fiber-reinforced molded plastic part according to the invention. The molded plastic part has a plastic matrix in which the natural fibers 1 are arranged in a uniformly distributed manner. The plastic matrix itself has two mutually mixed polymers of which one is a biopolymer 2 and the other is a polymer 3 which is at least largely resistant to biological stress. However, even the resistant polymer 3 is advantageously also a plastic material which itself or at least whose starting products are reproducible raw materials.

The use of thermoplastic and/or granular starch is expedient for use as the biopolymer 2. It is advantageous to use a thermoplastic polymer as the resistant polymer 3, in which case the following substances are particularly favorable: Polyurethane (PU) and/or polyamide (PA) and/or cellulose and/or a cellulose derivative and/or cellulose propionate and/or PA 11 and/or PA 610 and/or PA 669 and/or a PA on the basis of azelainic acid and/or a thermoplastic PU with a polyol constituent of reproducible raw materials and/or a is cellulose ether ester.

In the case of a cellulose ether ester as the resistant polymer 3, it is useful to use a cellulose ether ester with a high degree of substitution because it is at least largely biologically resistant.

In an expedient manner, the biopolymer 2 forms a disperse phase in the plastic matrix while the resistant polymer 3 forms a continuous phase, the resistant polymer 3 at least largely, preferably completely enclosing the disperse phase.

When thermoplastic starch is used for the plastic matrix, the starch can be rendered soluble by means of customary softeners, such as glycerin and/or urea and/or fruit acid, for a better processing.

In the following, the possible production of a fiber-reinforced molded plastic part according to the invention will be described. First, the grainy plastic mass of the biopolymer 2 and the resistant polymer 3 is mixed with natural fibers 1, whereby the natural fibers 1 are distributed in the plastic mass. During the distribution of the natural fibers 1 in the plastic mass, these are preferably at least largely enclosed by the plastic mass.

Subsequently, the plastic material/natural fiber mixture, which has between 5 and 60% by weight, particularly between 5 and 35% by weight natural fibers 1, is heated to a temperature of between 100° C. to 250° C., particularly to 230° C., for example, by means of an agglomerator.

The heated plastic material/natural fiber mixture is brought to the desired shape by processes which are known per se, such as injection-molding, extruding and/or pressing and the like and is cooled, hardening the molded plastic part. At the latest, during the shaping of the molded plastic part, the biopolymer 2 is at least largely enclosed by the resistant polymer 3.

Preferred uses for such molded plastic parts are molded parts for trucks and passenger cars or rail vehicles or aircraft, particularly for their body and/or their panelling.

For the processing of the plastic material/natural fiber mixture before the forming of the molded plastic parts, an agglomerator system of Pallmann Co., Model PFY 250/40 was used, among others (see Table 1 and 2, Samples 1 to 3 and 6). The perforated matrix of the agglomerator had a diameter of 280 mm, a thickness of 92 mm and a bore diameter of 3.2 mm.

For producing the plastic material/natural fiber mixture, the resistant polymer 3—in the case of Samples 1 to 6 described in the tables, cellulose propionate (CP)—and the biopolymer 2 granular potato starch (Samples 1 to 3) or granular thermoplastic starch (in Sample 6) were premixed, and were supplied to a feeding screw by way of a vibrating groove.

The apportioning of the natural fibers 1 (green flax fibers) takes place by way of an apportioning storage container and a delivery screw in the area of the feeding screw. In the working chamber of the agglomerator, the premix is plastified and is pressed through the bores of the perforated matrix.

The processing temperature achieved by friction was between 150 and 200° C. The throughput was approximately 150 kg/h at an apparent density of between 490 and 500 g/l.

By means of the above method, a compact plastic material/natural fiber mixture (agglomerator) is produced of a relatively uniform size, a good cohesion and a sufficient homogeneity, from which the molded plastic part can be produced subsequently in a customary manner. The natural fibers are uniformly distributed in the molded plastic. In the following two tables, such molded plastic parts are marked "A" at the end (see Samples 1 to 3 as well as Sample 6).

The advantages of the agglomerator are that no thermal degradation of the plastic materials and of the fibers takes place;

that a pourable plastic material/natural fiber mixture is produced;

that the plastic material/natural fiber mixture has a high stability so that, during a further processing and during a transport, it may, if at all, slightly disintegrate; and that the plastic material/natural fiber mixture has a low moisture content because of a degassing.

During the manufacturing of the molded plastic parts, a flat matrix press was also used which is better known under the name "edge mill". In this case, the plastic materials and the natural fibers 1 are only pressed together mechanically and are not plastified. This is therefore a compacting in the case of which the plastic material—fiber mixture is compressed such that a molded plastic part is formed which has a sufficient stability and strength. Molded plastic parts of this type are marked "B" at the end in the following two tables (see Samples 1 to 3 as well as Sample 6).

The two above-mentioned Tables 1 and 2 indicate the water absorption and some characteristics of the material of molded plastic parts manufactured according to the invention. In the case of the individual Samples 1 to 6, the used materials are indicated as well as their composition in percentages. For a better comparison, Samples 1 to 5 have the same starting materials, with the exception of different proportions of softeners.

Differences occurred in the mixing ratio and in the production of the plastic material/natural fiber mixture which—as mentioned above—was produced either by means of an agglomerator or a flat matrix press (thus, a so-called edge mill).

For characterizing the composition of the samples, the general nomenclature is used which is listed in the following.

Sample i) : Ex/F/FF, with E being a material and x a softener, in %; U:V:W, where U, V and W are respective percentages and A or K, which are processes, with E: CP with x-% softener and/or E: thermoplastic starch (TPS) with x-% glycerin (G) as the softener F: granular potato starch (gKS), FF: green flax fibers A: use of an agglomerator K: use of an edge mill.

TABLE 1

Water Absorption in [%] according to DIN 53 495

| Sample | Composition | 1 Hr. | 2 Hr. | 4 Hr. | 8 Hr. | 24 Hr. |
|---|---|---|---|---|---|---|
| 1 | CP10/gKS/FF 70:20:10 A | 0.6 | 0.7 | 1.1 | — | 1.7 |
| 2 | CP10/gKS/FF 60:27:13 A | 0.9 | 1.1 | 1.5 | — | 2.2 |
| 3 | CP10/gKS/FF 50:33:17 A | — | — | — | — | — |
| 4 | CP10/gKS/FF 60:20:20 K | 1.1 | 1.5 | 2.0 | — | 2.7 |
| 5 | CP10/gKS/FF 60:27:13 K | 1.1 | 1.5 | 1.9 | — | 2.7 |
| 6 | CP10/gKS/FF 43:43:14 A | 1.4 | 2.1 | 2.9 | 4.1 | 7.2 |

TABLE 2

Characteristics of Material

| Sample Impact Strength accord. to 53 453 [KJ/m] | Composition | Modulus of E in Tension accord. to DIN 53 455 in [N/nm$^2$] | Tensile Strength accord. to DIN 445 in [N/nm$^2$] | DIN in |
|---|---|---|---|---|
| 1 | CP10/gKS/FF 70:20:10 A | 3623 | 41 | 8 |
| 2 | CP10/gKS/FF 60:27:13 A | 4580 | 41 | 8 |
| 3 | CP10/gKS/FF 50:33:17 A | 4357 | 37 | 5 |
| 4 | CP10/gKS/FF 60:20:20 K | 5142 | 36 | 8 |
| 5 | CP10/gKS/FF 60:27:13 K | 4358 | 34 | 8 |
| 6 | CP10/gKS/FF 43:43:14 A | 3238 | 29 | 7 |

Other examples of manufacturing the starting material and fiber-reinforced plastic molded parts produced therefrom are listed below.

EXAMPLE 1

Polyamide 11/flax fibers

Specific material

| | |
|---|---|
| Matrix | Polyamide 11 made by Elf Atochem, trade name Rilsan B, powder |
| Fibers | flax fibers, average fiber length approx. 2.150 mm |
| Percent fiber volume | 25% | processing parameters

| | |
|---|---|
| Processing machine | ring matrix press |
| Inside diameter | 120 mm |
| Outside diameter | 160 mm |
| Number of holes | 300 |
| Hole diameter | 4 mm |
| Blade rpm | 260/min |
| Product temperature | approx. 150° C. |
| Throughput | 30 kg/h |

Product properties

| | |
|---|---|
| Tensile strength | 52.5 MPa |
| Tensile E Modulus | 4.050 MPa |
| Impact resistance | 15 kJ/m$^2$ |

EXAMPLE 2

Cellulose propionate/flax fibers

Specific material

| | |
|---|---|
| Matrix | cellulose propionate made by Albis, trade name Cellidor CP 400-10, granulate |
| Fibers | flax fibers, average fiber length approx. 2.150 mm |
| Percent fiber volume | 26% |

Processing parameters

| | |
|---|---|
| Processing machine | ring matrix press |
| Inside diameter | 120 mm |
| Outside diameter | 145 mm |
| Number of holes | 300 |
| Hole diameter | 3.2 mm |
| Blade rpm | 433/min |
| Product temperature | approx. 145° C. |
| Throughput | 30 kg/h |

Product properties

| | |
|---|---|
| Tensile strength | 52.5 MPa |
| Tensile E modulus | 5.475 MPa |
| Impact resistance | 10.5 kJ/m$^2$ |
| Average fiber length | 775μ |

EXAMPLE 3

Cellulose propionate/granular starch/flax fibers

Specific material

| | |
|---|---|
| Matrix | cellulose propionate made by albis, trade name Cellidor CP 400-10, granulate |

-continued

Cellulose propionate/granular starch/flax fibers

Specific material

| | |
|---|---|
| Filler | granular potato starch made by Südstärke, trade name Superior |
| Percent filler volume | 20% |
| Fibers | flax fibers, average fiber length approx. 2.500 mm |
| Percent fiber volume | 9% |

Processing parameters

| | |
|---|---|
| Processing machine | ring matrix press |
| Inside diameter | 250 mm |
| Outside diameter | 280 mm |
| Number of holes | — |
| Hole diameter | 3.2 mm |
| Blade rpm | 700/min |
| Product temperature | approx. 175° C. |
| Throughput | — |

Product properties

| | |
|---|---|
| Tensile strength | 41 MPa |
| Tensile E modulus | 3.625 MPa |
| Impact resistance | 10.5 kJ/m$^2$ |
| Average fiber length | 1.245μ |

EXAMPLE 4

Cellulose propionate/flax fibers

Specific material

| | |
|---|---|
| Matrix | Cellulose propionate made by Eastman, trade name Tenite Propionate 360-16, powder |
| Fibers | flax fibers, average fiber length aprox. 2.500 mm |
| Percent fiber volume | 26% |

Processing parameters

| | |
|---|---|
| Processing machine | flat matrix press |
| Matrix diameter | 175 mm |
| Number of holes | — |
| Hole diameter | 4 mm |
| Blade rpm | 100/min |
| Product temperature | approx. 110° C. |
| Throughput | 19 kg/h |

Product properties

| | |
|---|---|
| Tensile strength | 32 MPa |
| Tensile E modulus | 3.910 MPa |
| Impact resistance | 15.5 kJ/m$^2$ |
| Average fiber length | 820μ |

Figure 2:
FIG. 2 is a view of a 500-fold enlargement of a cut through Sample 2 taken by means of a scanning electron microscope.
Figure 3:
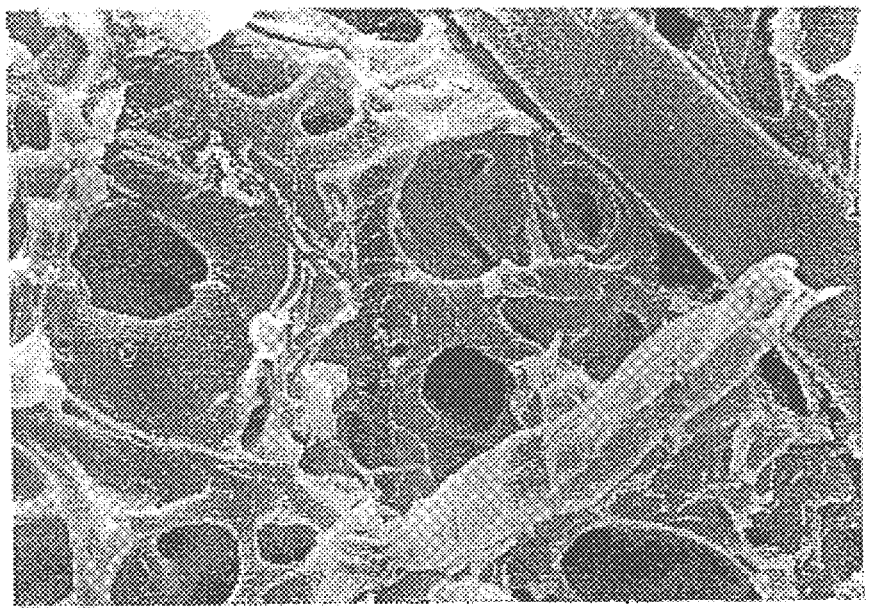
FIG. 3 is a view of a scanning electron microscope picture of a 500-fold enlargement of a cut through Sample 5.
Figure 4:
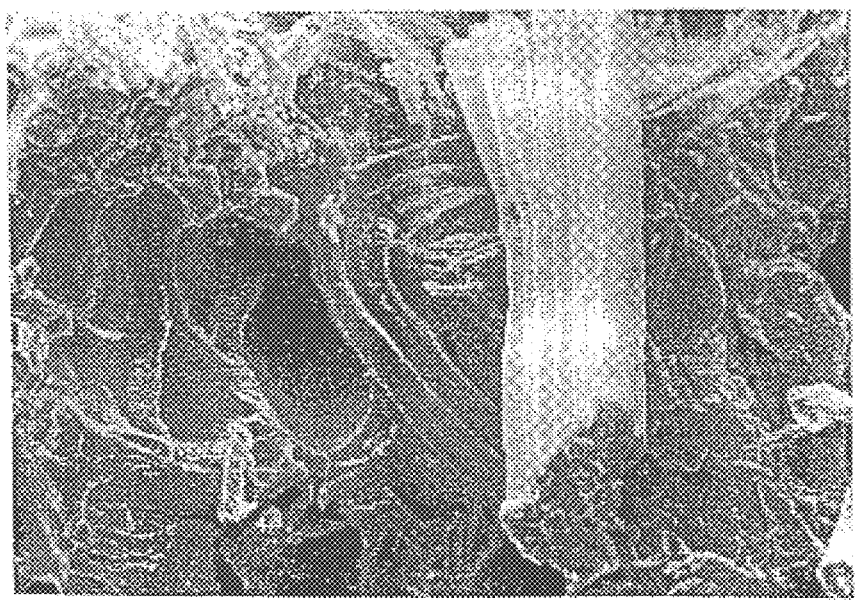
FIG. 4 is a view of a scanning electron microscope picture of a 500-fold enlargement of a cut through Sample 6.

FIGS. 2 to 4 show scanning electron microscope pictures (SEM) of cuts through Samples 2, 5 and 6 with a 500-fold enlargement. Before the pictures were taken, the gKS was removed from the area of the cut by rinsing with water; that is, gKS was in the indentations, in which case the visible material which concerns no fibers is the resistant polymer; in this case, therefore CP. All pictures have in common that they have a uniform distribution of plastic materials and of the fibers. Furthermore, it can easily be recognized that the resistant polymer largely encloses the biopolymer and the fibers.

Preferred uses for such molded plastic parts are molded parts for trucks or passenger cars or rail vehicles or aircraft, particularly their body and/or their panelling.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fiber-reinforced molded plastic part, the part comprising a plastic matrix with embedded natural fibers, the plastic matrix comprising:
   at least one biopolymer selected from the group consisting of thermoplastic starch and granular starch; and
   at least one thermoplastic polymer selected from the group consisting of poly(imino(1-oxyundecamethylene)); poly(hexamethylene sebacamide); poly((e-caprolactam) co(hexamethylene azelaic amide)); polyamide of azelainic acid; polyurethane with a polyol constituent of reproducible raw materials; cellulose propionate, and cellulose ether ester,
   wherein the at least one biopolymer forms a disperse phase in the plastic matrix and the at least one thermoplastic polymer forms a continuous phase thereby enclosing the at least one biopolymer.

2. A fiber-reinforced molded plastic part, the part comprising a plastic matrix with embedded natural fibers, the plastic matrix consisting of:
   at least one biopolymer selected from the group consisting of thermoplastic starch and granular starch; and
   at least one thermoplastic polymer selected from the group consisting of poly(imino(1-oxyundecamethylene)); poly(hexamethylene sebacamide); poly((e-caprolactam) co(hexamethylene azelaic amide)); polyamide of azelainic acid; polyurethane with a polyol constituent of reproducible raw materials; cellulose propionate, and cellulose ether ester,
   wherein the at least one biopolymer forms a disperse phase in the plastic matrix and the at least one thermoplastic polymer forms a continuous phase thereby enclosing the at least one biopolymer.

3. A fiber-reinforced molded plastic part, the part comprising a plastic matrix with embedded natural green flax fibers, the plastic matrix comprising:
   at least one biopolymer selected from the group consisting of thermoplastic starch and granular starch; and
   at least one thermoplastic polymer selected from the group consisting of polyamide, polyurethane, cellulose propionate, and cellulose ether ester,
   wherein the at least one biopolymer forms a disperse phase in the plastic matrix and the at least one polymer forms a continuous phase thereby enclosing the at least one biopolymer.

4. The molded plastic part of claim 1, wherein said thermoplastic starch has been rendered thermoplastic by the addition of a softener selected from the group consisting of glycerin, urea and fruit acid and mixtures thereof.

5. The molded plastic part of claim 1, wherein the natural fibers are arranged in a uniformly distributed manner.

6. The molded plastic part of claim 1, wherein the at least one thermoplastic polymer completely encloses the disperse phase.

7. The molded part of claim 1, wherein the plastic part is at least 80% reproducible raw materials by weight.

8. The molded plastic part of claim 1, wherein the natural fibers are 5–60% by weight of the plastic part.

9. The molded plastic part according to claim 1, wherein said natural fibers are between 5 and 35% by weight.

10. The molded part according to claim 1, wherein said at least one biopolymer is present in an amount of 20 to 43 wt. %.

11. The molded part according to claim 1, wherein said at least one thermoplastic polymer is present in an amount of 43 to 70 wt. %.

* * * * *

UNITED STATES PATENT AND TRADEMARK OFFICE
CERTIFICATE OF CORRECTION

PATENT NO.   : 6,184,272 B1
DATED        : February 6, 2001
INVENTOR(S)  : Thomas Foelster et al.

It is certified that error appears in the above-identified patent and that said Letters Patent is hereby corrected as shown below:

<u>Title page,</u>
Item [73], please correct the spelling of the Assignee to read -- DaimlerChrysler AG, Stuttgart (DE) --

Signed and Sealed this

Third Day of September, 2002

Attest:

Attesting Officer

JAMES E. ROGAN
*Director of the United States Patent and Trademark Office*